Figure 1:
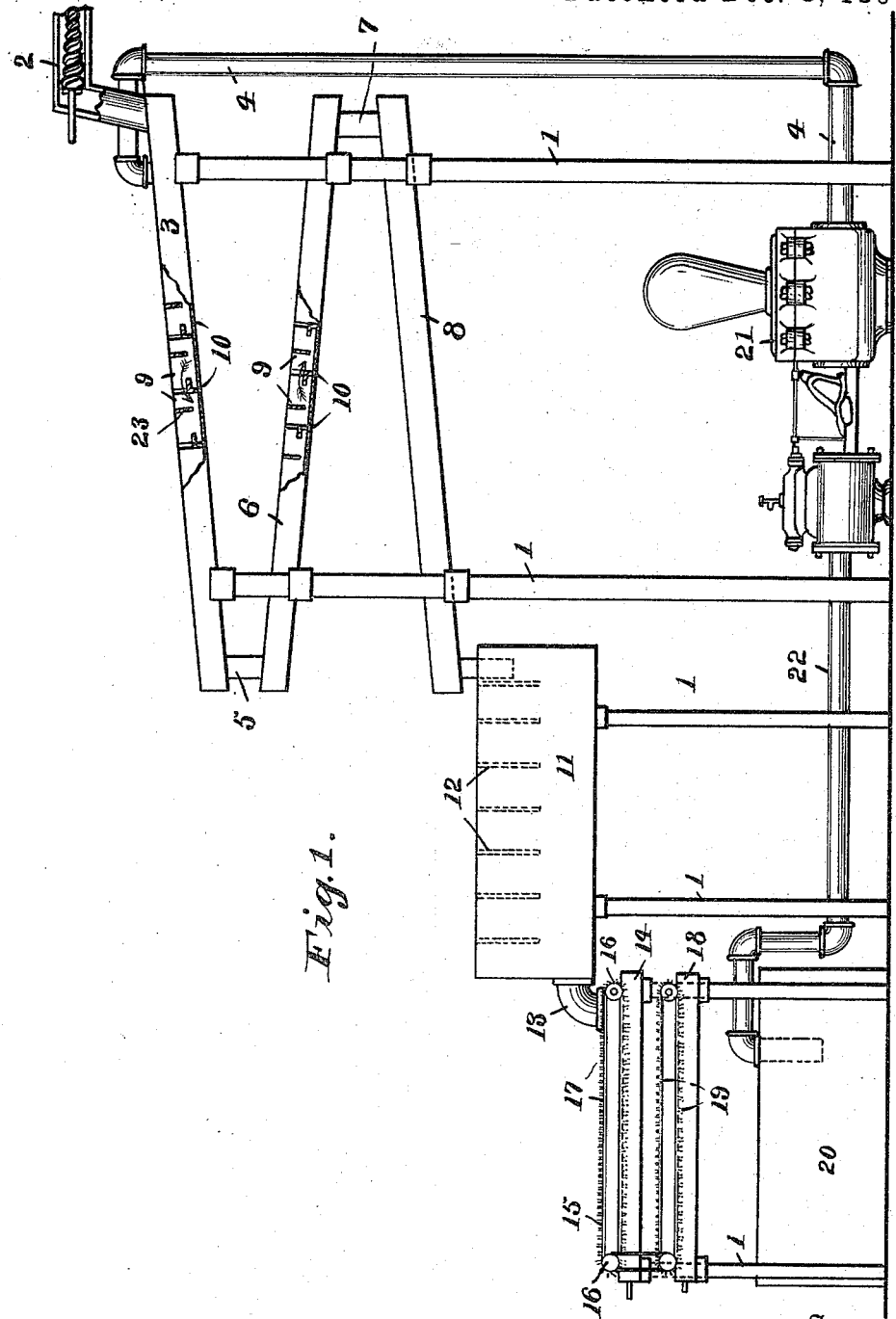

(No Model.) 2 Sheets—Sheet 1.

W. F. ASKAM.
RUBBER SEPARATOR.

No. 572,854. Patented Dec. 8, 1896.

Witnesses
R. H. Newman.
Harriet E. Slason.

Inventor
WILLIAM F. ASKAM
By Chamberlain & Newman
Attorneys

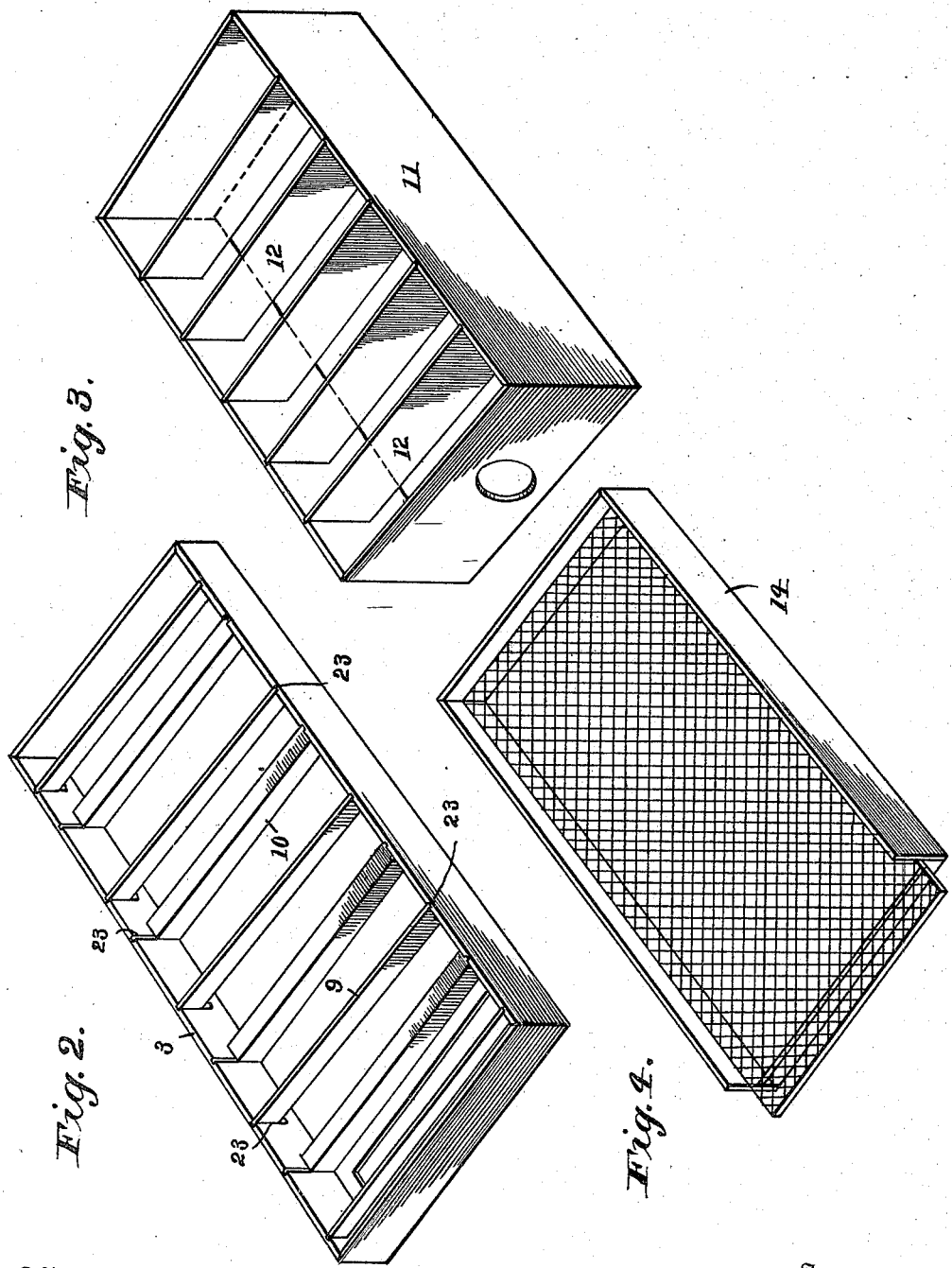

UNITED STATES PATENT OFFICE.

WILLIAM F. ASKAM, OF SHELTON, CONNECTICUT.

RUBBER-SEPARATOR.

SPECIFICATION forming part of Letters Patent No. 572,854, dated December 8, 1896.

Application filed May 12, 1896. Serial No. 591,238. (No model.)

*To all whom it may concern:*

Be it known that I, WILLIAM F. ASKAM, a citizen of the United States, and a resident of Shelton, in the county of Fairfield and State of Connecticut, have invented certain new and useful Improvements in Rubber-Separators, of which the following is a specification.

This invention relates to new and useful improvements in means for separating rubber from sand, dirt, and other objectionable matter, such as is present in stock ground up from old scrap, such as rubber boots, shoes, hose, &c.

It is the object of my invention to produce an apparatus which is more effective and more desirable than those for the purpose now upon the market, and, further, to so construct said separator that it may be operated at a considerable less expense than similar machines now in use.

It is a further object to construct and arrange my separator in such a manner that the same water for cleansing and separating purposes can be used repeatedly, thus obviating the necessity of requiring a continual flow of water, which is expensive and also objectionable from the fact that more or less of the finest of the rubber is unavoidably carried off by the discharged water.

With the above objects in view I have devised the simple and novel construction shown upon the accompanying drawings, forming a part of this specification, and upon which the same numerals of reference denote like or corresponding parts, and of which—

Figure 1 illustrates a side elevation of my apparatus complete, a portion of two of the troughs being broken away to show their internal arrangements. Fig. 2 is a detached perspective view of one of the troughs shown in Fig. 1 and indicated by 3. Fig. 3 is a similar perspective view of the tank 11 shown in Fig. 1. Fig. 4 is also a perspective view of one of the separating-sieves 14 shown in Fig. 1.

Referring to the numerals of reference upon the accompanying drawings, 1 indicates suitable framework upon which the several sections of my apparatus are mounted. Said framework may be varied at will to suit the situation and convenience of the several sections of the apparatus.

2 indicates a feed-screw, of which there may be one or more, to feed the rubber and its impurities in their ground state into the trough 3 from any suitable hopper or other receptacle. Said trough is provided with a water-supply pipe 4, whereby an abundant supply of water is discharged upon and adjacent to the constantly-incoming supply of rubber, thus washing the same down the inclined surface of said trough until the bulk thereof is discharged through the connection 5 at the lower end into the intermediate trough 6, which is of a similar construction to that of the trough 3. From this trough 6 the water and rubber are discharged through the connection 7 into the bottom trough 8, immediately below. Within each of these troughs 3, 6, and 8, above named, I arrange a series of diaphragms 9 at substantially an equal distance apart, and which extend from the top of said troughs to about midway of their depth, thus leaving a water-opening therethrough. Between said diaphragms 9 and to the bottom of the troughs I also arrange a series of upwardly-extending partitions or dams 10, which are provided with an angular extension deflected against the flow of water in such a manner as to somewhat retard the flow thereof, and thus form small eddies at each of these successive dams, which insures the settlement of the heaviest of the stock, such as sand, mud, &c., allowing the rubber to flow over said dams and be finally discharged from the lower trough into the tank 11.

In order to properly regulate the flow of water, rubber, and other matter through the several troughs, I provide means for adjusting the height of the diaphragms, which consists in forming mortises 23 upon the inside of said troughs and by means of friction retaining said diaphragms therein at any desired height. The above in practice I find affords ample and desirable means for regulating the position of said diaphragms, which obviously controls the movement of the water. I also provide similar means for detaching the dams in said troughs, which detachment is desired for cleansing the trough of sand and other settlements when not in use.

The tank 11 serves as a final-settlement tank and is provided with a series of diaphragms 12, deflecting from the open top, as fully appears in Figs. 1 and 3 of the drawings. Said diaphragms serve to separate and detain the lightest of the matter, such as chips, cork, &c., which is mingled with the rubber. Said matter being light will collect at the top and be detained between said diaphragms in such a manner as to permit of it being removed through the open top of the tank by an attendant as often as he may deem necessary and proper.

From the tank 11 above named the rubber, which has been thoroughly cleansed by means of its passage through the several sections of the apparatus, is discharged from said tank by the flow of water therefrom through the pipe 13 and is deposited upon the sieve 14, which is provided with an endless chain 15, mounted upon suitable rolls 16, and which may be driven by any suitable connection. Said chain is provided with a series of flights 17, adapted to brush and convey the rubber from the inner to the outer end of said sieve, during which operation the water drains therefrom together with a portion of the finest of the rubber, while the coarse rubber is wiped from said sieve and discharged from the free end thereof into any suitable receptacle for the purpose. (Not shown.) Immediately below the sieve 14 is a second and finer sieve 18, which is in like manner provided with an endless chain 19, mounted and driven in substantially the same manner as the chain situated above it and previously described. From this sieve a finer grade of rubber is discharged in substantially the same manner as the coarse rubber is discharged from the sieve 14, and through the meshes of the latter sieve 18 the water is drained into the reverse tank 20, situated immediately below.

As stated before, I use the same water continuously, and in consequence employ a pump 21, which may be of any ordinary or preferred construction, to convey the water from said tank 20, through the pipes 22 and 4, to the first receiving-trough previously mentioned.

From this construction and arrangement it will be seen that my apparatus for separating rubber can be operated continuously with comparatively little attention and expense, utilizing but a small amount of water and wasting substantially none of the rubber, even though it may be ground very fine, as some of it necessarily would be.

Having thus described my invention, what I claim, and desire to secure by Letters Patent, is—

1. In a rubber-separating apparatus, the combination of a trough through which rubber is conveyed, dams arranged crosswise of said troughs, diaphragms arranged between said dams and crosswise of said trough in a manner to form a passage under said diaphragms and over the dams, substantially as described.

2. In a rubber-separating apparatus, the combination of a trough, means for feeding ground rubber therein, means for conveying water into said trough, dams arranged crosswise of said trough and provided with angular extensions, diaphragms arranged between said dams and crosswise of said trough and having an opening thereunder, means for varying the sizes of said opening, substantially as described.

3. In a rubber-separating apparatus, the combination of a trough through which rubber is conveyed, means for delivering rubber and water into said trough, dams arranged crosswise of said trough and provided with angular extensions, diaphragms arranged between said dams to detain the flow of water, a tank 11 adjacent to and connected with said trough, diaphragms in said tank extending below the water-line thereof, substantially as described.

4. In a rubber-separating apparatus, the combination of one or more troughs suitably arranged, means for delivering rubber and water into said troughs, dams and diaphragms alternately arranged in said troughs, a receiving-tank connected with said troughs and provided with diaphragms depending from the top and having passages thereunder, means to receive and separate the water and rubber, substantially as described.

Signed at Shelton, in the county of Fairfield and State of Connecticut, this 6th day of May, A. D. 1896.

WILLIAM F. ASKAM.

Witnesses:
WM. S. BROWNE,
SAM H. TESSEY.